United States Patent [19]

Whitley et al.

[11] Patent Number: 4,858,986

[45] Date of Patent: Aug. 22, 1989

[54] AUTOMOBILE-MOUNTED CAMPER

[76] Inventors: William N. Whitley, 19315 Shaker Blvd.; James M. Whitley, 2963 Morley, both of Shaker Heights, Ohio 44122

[21] Appl. No.: 16,523

[22] Filed: Feb. 17, 1987

Related U.S. Application Data

[63] Continuation of Ser. No. 898,816, Aug. 18, 1986, abandoned, which is a continuation of Ser. No. 629,077, Jul. 9, 1984, abandoned.

[51] Int. Cl.$^4$ .............................................. B60P 3/34
[52] U.S. Cl. ..................................... 296/165; 296/26; 296/163; 296/27; 296/161
[58] Field of Search ................... 296/26, 159, 161, 27, 296/163, 165, 173

[56] References Cited

U.S. PATENT DOCUMENTS

| Re. 29,264 | 6/1977 | Woodward | 296/159 |
|---|---|---|---|
| 3,058,643 | 10/1982 | Wilson | 229/23 R |
| 3,160,434 | 12/1964 | Hedgepeth | 296/161 |
| 3,472,571 | 10/1969 | Himelreich | 229/23 R |
| 3,733,102 | 5/1973 | Serino et al. | 296/164 |
| 3,888,539 | 6/1975 | Niessner | 296/26 |
| 4,065,166 | 12/1977 | Shoemaker | 296/26 |
| 4,101,062 | 7/1978 | Lazar | 296/26 |
| 4,300,797 | 11/1981 | Whitley et al. | 296/164 |

FOREIGN PATENT DOCUMENTS

| 3125600 | 2/1983 | Fed. Rep. of Germany | 296/165 |
|---|---|---|---|
| 2458425 | 2/1981 | France | 135/88 |

*Primary Examiner*—Dennis H. Pedder
*Attorney, Agent, or Firm*—Wayne D. Porter, Jr.

[57] ABSTRACT

An inexpensive, lightweight camper is releasably mountable about trunk portions of an automobile without requiring the formation of holes in the automobile body. The camper has a flat floor and front, rear, top and side walls which are foldable to compactly overlie the trunk of the automobile. In the extended position, the camper is relatively large and has the capability of sleeping at least two adults. In the collapsed position, the camper is substantially reduced in size for over-the-road travel. The camper includes a canopy having depending flanges which enclose the remainder of the camper when the camper is in a collapsed position. The expense of the camper is minimized by the use of cardboard as a construction material.

10 Claims, 5 Drawing Sheets

AUTOMOBILE-MOUNTED CAMPER

CROSS-REFERENCE TO RELATED APPLICATIONS

This application is a continuation of Ser. No. 898,816, field Aug. 18, 1986, abandoned, which was a continuation of Ser. No. 629,077, filed July 9, 1984, abandoned.

REFERENCE TO RELATED PATENTS

The disclosures of the following patents are incorporated herein by reference:

1. U.S. Pat. No. 4,181,348, Trunk-Mountable Camper Capsule for Automobile, patented Jan. 1, 1980, by William N. Whitley and James M. Whitley.
2. U.S. Design Pat. No. 256,685, Vehicle-Supported Shelter, patented Sept. 2, 1980, by William N. Whitley and James M. Whitley.
3. U.S. Pat. No. 4,220,369, Foldable Trunk-Mountable Camper, patented Sept. 2, 1980, by William N. Whitley and James M. Whitley.
4. U.S. Pat. No. 4,300,797, Compactly Foldable Recreation Enclosure, patented November 17, 1981, by William N. Whitley and James M. Whitley.

BACKGROUND OF THE INVENTION

1. Field of the Invention

The present invention relates generally to recreation enclosures such as campers and, more particularly, to an inexpensive, compactly foldable camper which may be secured to the rear of an automobile.

2. Description of the Prior Art

In travelling from place to place by automobile, a traveler is confronted with various choices in obtaining shelter. One approach is to stay at hotels or motels which, although presumably comfortable, are quite expensive. Another approach is to tow a camper or trailer behind the automobile. Such a camper or trailer presumably also is comfortable, but again is expensive. Yet an additional approach is to carry a tent in the automobile and to pitch the tent each time one desires shelter. Although this latter approach is far less expensive than the former approaches, the difficulties associated with pitching a tent each time shelter is needed usually far outweigh the advantages of inexpensiveness associated with a tent.

In an attempt to provide a reasonable middle ground between the foregoing approaches, various proposals have been advanced for automobile-mounted campers which would avoid the expense associated with hotels and the like, while at the same time would avoid the inconvenience associated with pitching a tent. Unfortunately, many proposals for vehicle-attached campers have suffered from one or more of the following drawbacks:

A. The proposed campers have been relatively massive, both in size and in weight. In many instances, the campers have required specialized equipment to effect their attachment to the automobile.
B. Where the proposed campers have been of sufficiently large size to accommodate several persons, the weight of the campers has undesirably affected the driving characteristics of the automobile. In some cases, special suspension equipment has been needed to properly support the campers.
C. Where proposed campers have been designed for mounting over the trunk of an automobile, thy either have required removal of the trunk lid in order to permit the use of the trunk space or they have been mounted at distances sufficiently removed from the trunk lid to permit its opening. In effect, these campers have inhibited normal access to the trunk of the automobile.
D. Many automobile-mounted campers have required special fasteners to be installed through the body of the automobile. These fasteners are unsightly and they destroy the watertight integrity of the trunk and/or passenger compartment of the automobile.

The referenced patents have addressed many of the foregoing concerns and have provided campers which are acceptable in many respects. For example, the '797 patent discloses and claims a compactly foldable recreation enclosure in the form of a camper which may be attached to an automobile over trunk portions of the automobile. The camper disclosed and claimed in the '797 patent sets forth many of the features that an ideal camper would have, but certain concerns still remain. One of the concerns relates to expense. The structure disclosed and claimed in the '797 patent, although exceedingly effective at providing a lightweight, compactly foldable camper, still is more expensive than desired. It is believed that a substantial market exists for automobile-mounted campers if the cost can be reduced.

Yet another concern with the structure set forth in the '797 patent relates to electrical connections needed to be made with the electrical system of the automobile. The structure in the '797 patent extends slightly below the level of the automobile's bumper and completely across the width of the automobile. Accordingly, the conventional taillights of the automobile are obstructed by the enclosure. In turn, the enclosure itself must be provided with lights and electrical wiring which, upon connection with the electrical system of the automobile, will provide acceptable brakelights and turn signal lights. The very existence of the lights and wiring adds an element of expense and complexity.

While the camper set forth in the '797 patent contains upper portions which enable the camper to be folded to an extremely compact configuration, the camper also contains non-collapsible lower portions which contribute to the bulk and expense of the camper. Desirably, a lightweight and inexpensive camper would avoid the need for a non-collapsible lower portion or would have a lower portion that could be collapsed for over-the-road travel.

SUMMARY OF THE INVENTION

The present invention relates to a camper which can be manufactured with the utmost simplicity and inexpensiveness. In accordance with the preferred practice of the present invention, an automobile-mounted camper includes a rigid floor supporting a collapsible upper portion. The upper portion, when extended, creates an enclosure of a size and shape suitable for sleeping at least two adults. The camper does not include a rigid bottom structure as such, but rather includes a flexible storage compartment which may be disposed intermediate the underside of the floor and the ground. The upper portion includes walls which can be manufactured from waterproofed cardboard. In the preferred embodiment, the upper portion is formed from two mating sections of cardboard, each section being formed from a single sheet of cardboard. The wall portions of the assembled upper portion preferably include a front wall, top wall, rear wall and a plurality of side wall portions which are hingedly interconnected and arranged to be folded to a thin, collapsed position.

The camper according to the invention includes means for pivotally connecting the floor to the bumper of the automobile, as well as means for connecting the floor to body portions of the automobile without the need for drilling holes or otherwise altering the configuration of the automobile. An additional feature of the invention is that of a canopy hingedly secured to the upper edge of the front wall of the upper portion. When the upper portion is in he extended position, the canopy can be propped to an open position to provide shade and protection from the elements. When the upper portion is in the collapsed position, the canopy can be moved to a position overlying and protecting the other components of the camper. The invention also includes zippered panels for providing access to the upper portion and the storage compartment.

The present invention provides an automobile-mounted camper wherein the need for lights and electrical wiring is eliminated. The use of inexpensive, waterproofed cardboard contributes greatly to savings in manufacturing costs while, at the same time, providing a camper that is very light in weight and easy to use. The foregoing and other advantages and a fuller understanding of the invention described herein may be had by referring to the following detailed description and claims, taken in conjunction with the accompanying drawings.

DESCRIPTION OF THE PREFERRED EMBODIMENT

Figure 1:
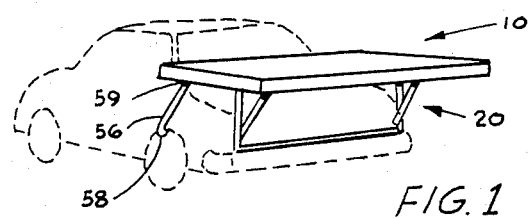
FIG. 1 is a perspective view of a camper according to the invention, the camper being shown in a collapsed position attached to an automobile for over-the-road travel.
Figure 2:
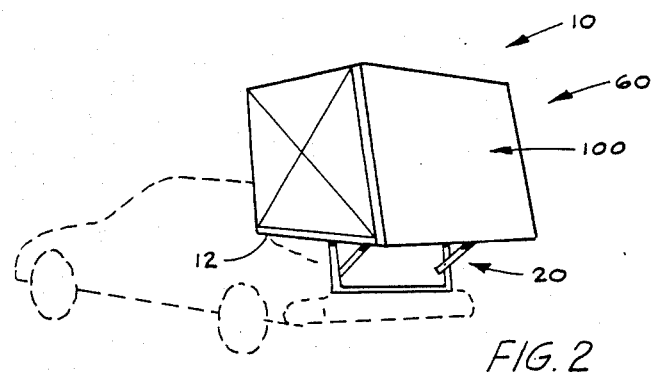
FIG. 2 is a perspective view similar to FIG. 1 with front, top, rear and side wall portions of the camper shown in an extended position to define an enclosure.

In accordance with the preferred practice of the present invention, a camper 10 adapted to be attached to an automobile includes a rigid floor 12 to which a collapsible upper portion 60 is secured. The upper portion 60 includes hingedly interconnected walls which can be folded to a thin, collapsed position overlying the trunk of the automobile to which the camper 10 is secured. When the walls are extended, the upper portion 60 defines an enclosure of a size and shape suitable for sleeping at least two adults. For convenience in describing the camper 10, the upper portion 60 will be referred to hereafter as "the enclosure", whether the walls of the upper portion 60 are collapsed or extended. Also, that portion of the camper 10 positioned closest to the bumper of the automobile will be considered the "front", that portion positioned closest to the front of the automobile will be considered the "rear", and those portions positioned on either side of the automobile will be considered the "sides".

The floor 12 is in the form of a rectangular piece of plywood approximately ½ inch thick, four feet wide, and six feet long. The floor 12 includes a rectangular cut-out section 14 along the front edge. The cut-out 14 is approximately four feet wide and two feet deep. A rectangular insert 16 can be positioned in the cut-out 14 when it is desired to provide the floor 12 with a continuous flat surface. The insert 16 is held in place within the cut-out 14 by metal clips 18 secured to the underside of the floor 12 by fasteners such as wood screws. The insert 16 can be removed when it is desired to have easier access to the interior of the enclosure 60 and when it is desired to stand within the camper 10 while being shielded.

Figure 3:
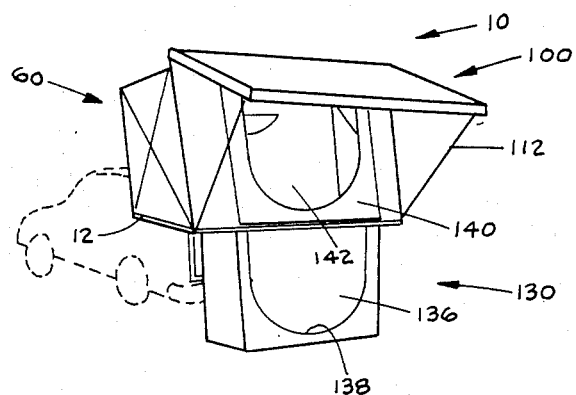
FIG. 3 is a view similar to FIG. 2, with a canopy shown in a raised position and a storage compartment shown in an extended position.
Figure 4:
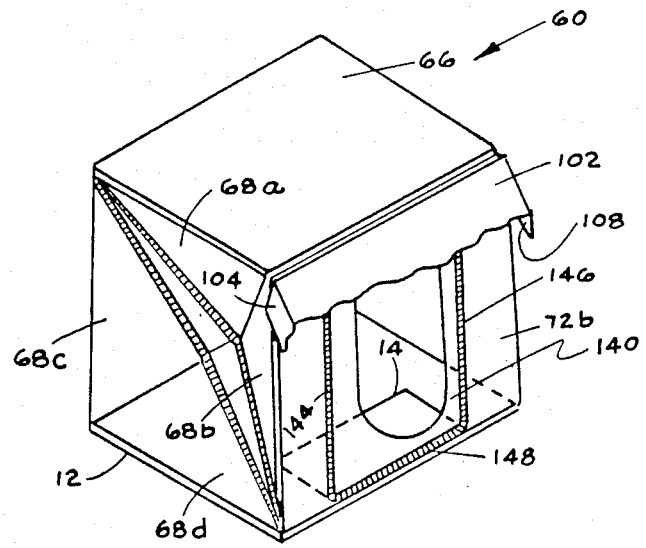
FIG. 4 is a view similar to FIG. 2 with side wall portions of the enclosure partially folded inwardly toward their collapsed position, and with other portions of the enclosure moved appropriately to permit the side wall portions to be inwardly folded.
Figure 7:
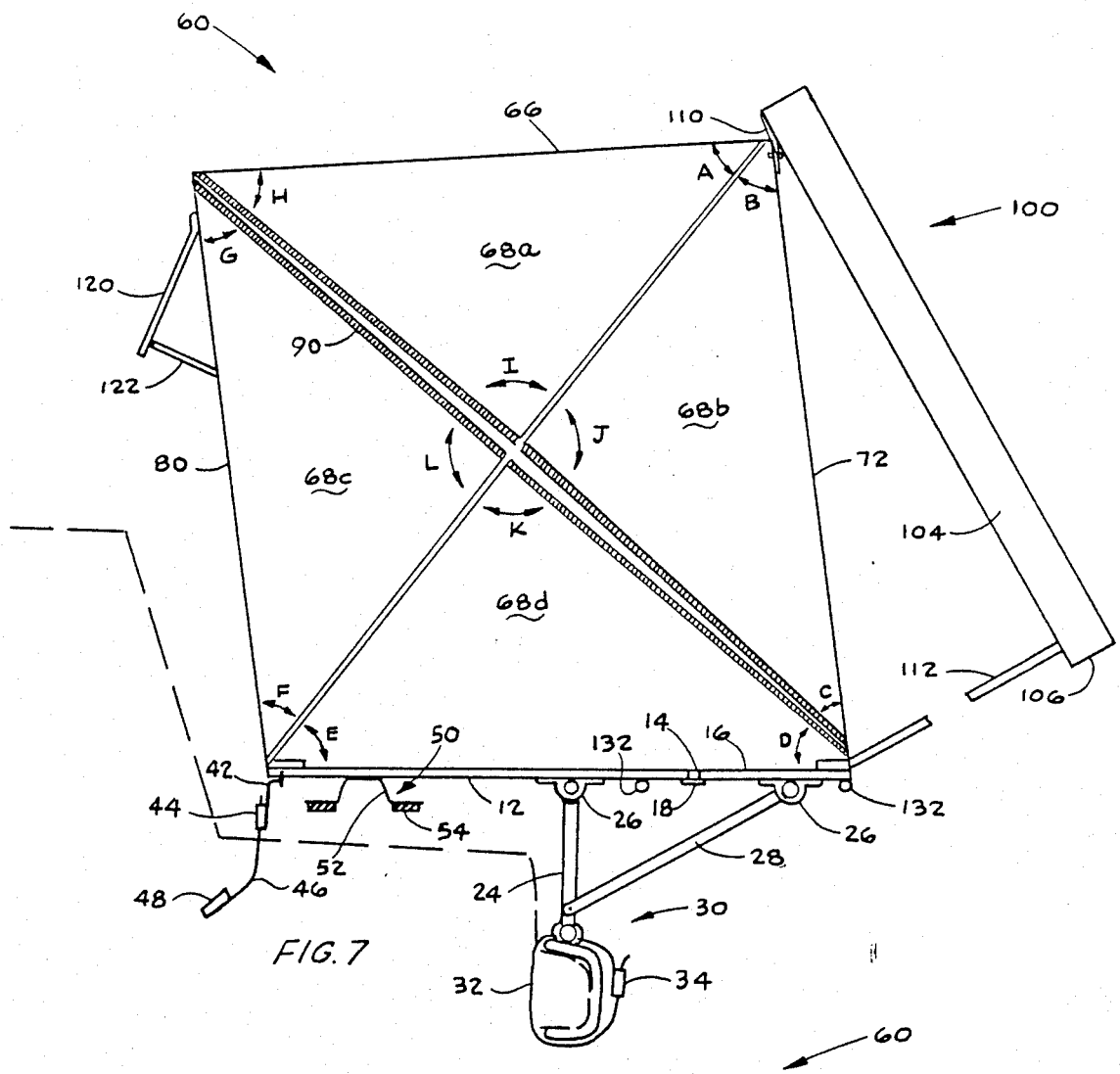
FIG. 7 is an enlarged sectional view of the camper as seen from a plane indicated by a broken line 7—7 in FIG. 3.
Figure 8:
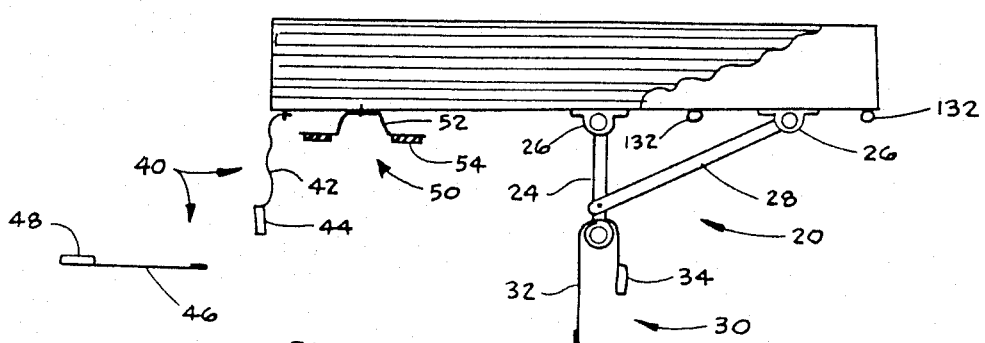
FIG. 8 is an enlarged view of the camper as seen from the left in FIG. 1.

Referring to FIGS. 3 and 7, the enclosure 60 is shown in its extended or operating position. Referring also to FIG. 8, the camper 10 is provided with a mounting system for supporting the camper 10 about the trunk of the automobile. The mounting system includes a bumper mounting assembly indicated in FIG. 8 by the reference numeral 20 and a body mounting assembly indicated by the reference numeral 40. The mounting assemblies 20, 40 do not require the formation of holes in the automobile so that the trunk is maintained in a watertight condition. The bumper mounting assembly 20 is operable to pivotally mount the camper 10 for movement to a position out of the path of travel of the trunk lid of the automobile, whereby ready access may be had to the trunk.

The bumper mounting assembly 20 includes a generally U-shaped piece of aluminum tubing 24. The tubing 24 is secured to the underside of the floor 12 approximately midway between the front and rear of the floor 12. The tubing 24 is positioned to extend laterally from near one side of the floor 12 to the other side of the floor 12. The tubing 24 is secured to the underside of the floor 12 by means of U-shaped brackets 26 held in place by fasteners such as wood screws. The bumper mounting assembly 20 also includes a pair of inclined braces 28 in the form of aluminum tubes secured to the underside of the floor 12 by additional U-shaped brackets 26. The braces 28 are secured to the vertically extending legs of the tubing 24 by fasteners such as bolts or rivets. The lower, elongate leg of the tubing 24 is adapted to be disposed atop the bumper of the automobile and is held in place there by flexible straps 30. The straps 30 are secured at one end to the tubing 24 by a loop. The straps 30 include a loose end 32 and a buckle 34 by which the end 32 can be tightened about the bumper. The tubing 24 is movable relative to the loops of the straps 30 such that the enclosure 10 can be pivoted clockwise as viewed in FIG. 7 in order to permit the trunk lid of the automobile to be opened.

The body mounting assembly 40 includes a plurality of straps 42 secured to the underside of the floor 12 near the rear of the floor 12. The straps 42 each include a buckle 44 at one end. The straps 42 are secured at the other end to the floor 12 by fasteners such as wood screws. The body mounting assembly 40 also includes a plurality of straps 46, each having a buckle 48. In use, the straps 46 are inserted between the trunk lid and the body portion of the automobile while the trunk lid is in an open position. The straps can be secured to a convenient interior portion of the automobile by means of the buckles 48, or the straps 46 simply can be held in place by hand. Thereafter, upon closing the trunk lid, the straps 46 will be available for connection to the buckles 44 of the straps 42. Upon appropriate tightening of the straps 42, 46, the camper 10 can be tightly secured to the automobile. The body mounting assembly 40 also includes a plurality of supports 50. The supports 50 each are in the form of generally U-shaped brackets 52 having rubber cushions 54 secured thereto. The brackets 52 are secured to the underside of the floor 12 by fasteners such as wood screws. The brackets 52 are provided in sufficient quantity and appropriate location so that loads imparted to the automobile from the enclosure 10 are evenly distributed and marring, denting, or other damage to the automobile is prevented. The body mounting assembly 40 also includes a plurality of elastic cords 56 (FIG. 1) for attaching the floor 12 to the automobile. The cords 56 have hooks 58 at each end. One of the hooks 58 can be engaged with eyelets 59 disposed at the sides of the floor 12, while the other of the hooks 58 can be engaged with the wheel well of one of the rear fenders.

Figure 9:
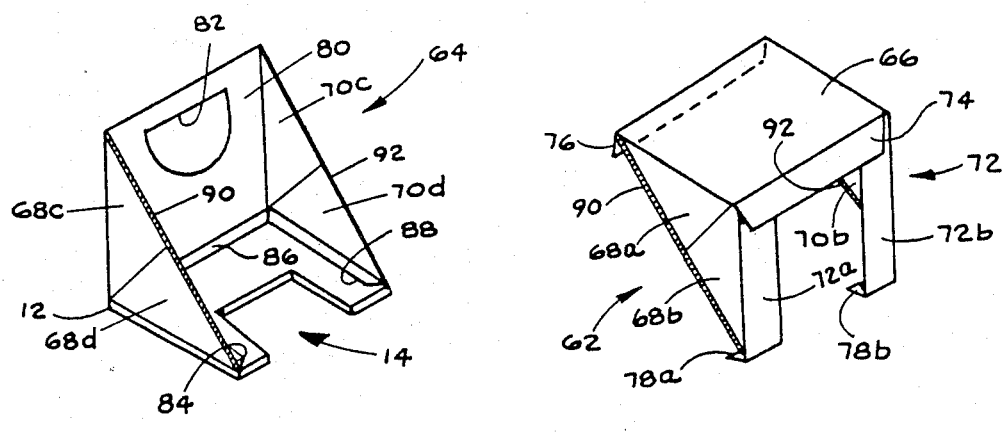
FIGS. 9 and 10 are perspective views of cardboard sections that are joined to form the collapsible upper portion of the camper.
Figure 10:
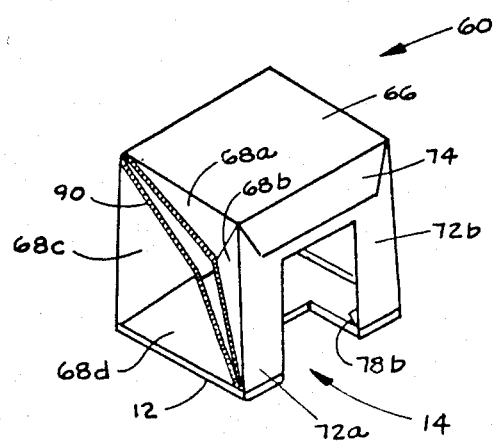

Referring particularly to FIGS. 9 and 10, the enclosure 60 is formed by the interaction of front and rear sections, 62, 64. The front section 62 is formed from a single sheet of cardboard. The section 62 is folded such that a top wall 66 is formed. Additionally, side wall sections 68a, 68b, 70a, 70b are formed. Yet additionally, a front wall 72 having sections 72a, 72b is formed, along with front and rear upper flaps 74, 76. A pair of hinge flanges 78a, 78b extend rearwardly from the lower edge of the front wall sections 72a, 72b.

In a manner similar to the front section 62, the rear section 64 is formed from a single sheet of cardboard. The section 64 includes a rear wall 80 having a semi-circular opening 82 formed therein near its upper edge. The rear section 64 also includes side wall sections 68c, 68d and 70c, 70d. Yet additionally, lower flanges 84, 86, 88 extend inwardly from the lower peripheral portion of the walls 68d, 70d and 80.

The cardboard from which the sections 62, 64 are formed is an inexpensive, lightweight material. The cardboard can be protected against the elements by any of various techniques such as being laminated between thin sheets of polypropylene or by impregnation with wax. The use of polypropylene sheets is preferred because this construction is thought to be more durable and because various decorative color schemes can be applied quite easily.

As can be seen from an examination of FIGS. 9 and 10, the first and second sections 62, 64 are joined to each other by means of fasteners such as stove bolts connecting the flap 76 and the upper edge of the rear wall 80. The sections 62, 64 also are connected by zippers 90, 92 extending along the intersection of the side wall sections 68a, 68b, 68c, 68d and 70a, 70b, 70c and 70d. If desired, selectively releasable fasteners such as VELCRO fasteners can be used in place of the zippers 90, 92. The front and rear sections 62, 64 are secured to the floor 12 by fasteners such as wood screws or carriage bolts extending through the flanges 78a, 78b, 84, 86, 88.

Referring now to FIG. 7, the assembled, opened enclosure 60 in vertical cross-section defines a quadilateral. The quadilateral is bounded by the floor 12, the top wall 66, the front wall 72 and the rear wall 80. In preferred form, the front wall 72 and the top wall 66 are the same length, while the width of the floor 12 and the height of the rear wall 80 are the same length. The front wall 72 is shorter than the rear wall 80, and, thus, the enclosure 60 in cross-section defines a trapezium. Because the walls 66, 72, 80 are approximately the same length, the enclosure 60 also approximates a parallelogram. The side wall portions 68a, 68b, 68c, 68d each are triangular and cooperate to completely fill the trapezium. The side wall portions 70a, 70b, 70c, 70d are identical in size and configuration to the side wall portions 68a, 68b, 68c, 68d. As will be appreciated from an examination of FIGS. 9 and 10, the various walls, flanges, and so forth constituting the front and rear sections 62, 64 are connected to each other by hinge lines formed by folding the single piece of cardboard from which the sections 62, 64 are formed. This construction eliminates the need for any other type of wall-to-wall connections such as flexible tape, webbing, metal hinges, and the like.

Angles A, B, C, D, E, F, G, H, I, J, K, and L indicate the various geometric relationships among the side wall sections 68a–d, 70a–d. More specifically, angles I, J, K, L are right angles, or substantially so, and the length of the top wall 66 and the front and rear walls 72, 80 are such that the side wall sections 68a–d, 70a–d approximately define right-angled scalene triangles. Because the front and rear walls 72, 80 are almost parallel with each other when the enclosure 60 is in the extended position, because the top wall 66 and the floor 12 are almost parallel with each other, and because the side wall sections 68a–d, 70a–d are connected to each other with straight edges, angle A approximately equals angle E, angle B approximately equals angle F, angle C approximately equals angle G, and angle D approximately equals angle H. In order for the enclosure 60 to fold compactly without buckling any of the components, angle A must equal angle B and angle E must equal angle F. Other geometric relationships among the various components of the enclosure 60 will be evident. From a functional point of view, upon extending the enclosure 60 to the position shown in FIGS. 1, 3, and 7, and upon closing the zippers 90, 92, the enclosure 60 will be exceedingly rigid and cannot be collapsed without undoing the zippers 90, 92.

Figure 5:
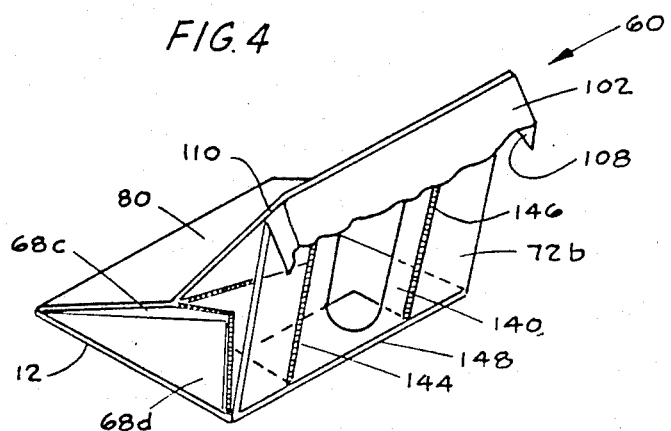
FIG. 5 is a view similar to FIG. 4 with side wall portions folded inwardly and showing front, top, and back wall portions during the process of being moved to a collapsed position.
Figure 6:
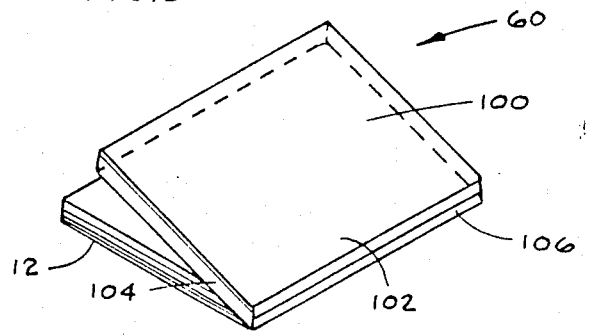
FIG. 6 is a view similar to FIG. 1 in which the front wall and canopy portions are approaching a fully collapsed position.

In order to collapse the enclosure 60 to a compact, folded position, and particularly referring to FIGS. 1–6, the zippers 90, 92 first are undone. The front and rear walls 72, 80 are pushed toward the front to a near vertical position. In this position, the side wall sections 68a–d and 70a–d are simultaneously folded inwardly toward each other. Thereafter, the front wall 72 is pivoted further toward the front toward a collapsed position, while the rear wall 80 assumes an extreme forwardly pivoted position (FIG. 5). The front wall 72 then is pivoted rearwardly to a position where it, along with the other folding components of the enclosure 60, overlies the floor 12. Suitable releasable fasteners (not shown) are provided to retain the enclosure 60 in its collapsed position for over-the-road travel.

Referring particularly to FIG. 8, the folded positions of the various components of the enclosure 60 are illustrated in great detail. In the completely collapsed position, the front wall 72 overlies the side wall sections 68a, 68b, 70a, 70b; the side wall sections 68a, 68b, 70a, 70b overlie the top wall 66. The top wall 66 overlies the rear wall 80, and the rear wall 80 overlies the side wall sections 68c, 68d, 70c, 70d. The height of the side wall sections is such that none of the sections 68a, 68b, 70a, 70b overlaps the side wall sections 68c, 68d, 70c, 70d in the collapsed position. That is, the height of any given side wall section is equal to or less than half the width of the walls 66, 72, 80. Accordingly, the various walls cooperate in the collapsed position to produce an exceedingly compact enclosure 60 having an essentially completely flat upper surface.

In order for the various walls which form the enclosure 60 to pivot and move in the manner described, suitable hinges are provided. As has been indicated already, the zippers 90, 92 and the foldable interconnections among the side walls 68, 70, the top wall 66, and the front and rear walls 72, 80 have been described already. Additionally, as will be apparent from an examination of FIGS. 1, 5, 6 and 8, the flanges 78a, 78b, 84, 86 and 88 are movable relative to the portions of the sections 62, 64 to which they are connected in order to permit the enclosure 60 to be collapsed and extended easily. This construction eliminates the use of other hinge structures such as fabric, webbing, or metal hinges, thereby saving expense and minimizing assembly difficulties.

A canopy 100 also is provided for the enclosure 60. The canopy 100, which may be formed of cardboard, if desired, includes a large, flat surface 102 having depending flanges 104, 106, 108. Referring particularly to FIG. 7, an upper flap 110 extends outwardly of the surface 102 and is connected to the front wall 72 near the upper portion thereof through the flap 74 by fasteners such as stove bolts. The flanges 104, 106, 108 extend outwardly of the surface 102 to such an extent that the canopy 100, when in the closed position (FIG. 1) will completely enclose the other components of the enclosure 60. By appropriately sizing the surface 102 and the flanges 104, 106, 108, a nearly watertight seal can be effected. The flap 110 is arranged relative to the surface 102 (FIG. 7) such that all of the components of the camper 10 with the exception of the mounting assemblies 20, 40 can be fitted completely within the canopy 100. In order to permit access to the interior of the enclosure 60 and to provide shade for users of the enclosure 60, the canopy 100 can be propped in an open position by a pair of elongate, steel rods 112 (FIG. 3). The rods 112 can be stored along the inside edge of the flap 106 by means of clips (not shown) positioned on the inner surface of the flap 106.

A cover 120 also is provided to close the opening 82 formed in the rear wall 80. The cover 120 is connected to the wall 80 along its upper edge by means of a flexible hinge such as fabric or tape as is well known. In a manner similar to the canopy 100, a rod 122 is provided to prop open the lower portion of the cover 120.

A storage compartment 130 also is included as part of the camper 10. Referring particularly to FIGS. 3, 7 and 8, the compartment 130 essentially consists of a cubic, bag-like structure suspended from the underside of the floor 12. The compartment 130 is formed of canvas, vinyl, or other flexible, durable substance. The compartment 130 is secured to the underside of the floor 12 by fasteners such as wood screws positioned close to the periphery of the cut-out section 16. In order to secure the compartment 130 in a storage position, a plurality of rings 132 are secured to the underside of the floor 12. A corresponding number of clips are fitted to the bottom portions of the compartment 130. As can be seen in FIG. 8, upon engaging the clips and rings, the compartment 130 will be tightly pressed against the underside of the floor 12 for storage or travel.

The compartment 130 also includes a flexible, removable panel 136 in its front wall. The panel 136, like the remainder of the compartment 130, is formed of canvas or vinyl. The panel 136 is removably attached to the remainder of the front wall by means of a zipper 138. The front wall 72 also is provided with a removable panel 140 having a screen 142 therein. The panel 140 is formed of canvas or vinyl while the screen 142 is formed of a light nylon mesh. The panel 140 is secured in place within the front wall 72 by means of zippers 144, 146. Another zipper 148 also is provided to interconnect the panels 136, 140. When it is desired to enter the enclosure 60 or if it is desired to stow the panel 140 in a retracted position, the zippers 144, 146, 148 can be withdrawn and the panel 140 can be rolled upwardly so as to create an opening in the front wall 72. A pair of ties (not shown) disposed near the upper edge of the front wall 72 are used to hold the panel 140 in a raised position. After a user has occupied the camper 10, the panels 136, 140 can be secured by the zippers 144, 146, 148, and the insert 16 can be taken out of the cut out 14. This will provide shielded standing space to the occupant of the camper 10.

Figure 11:
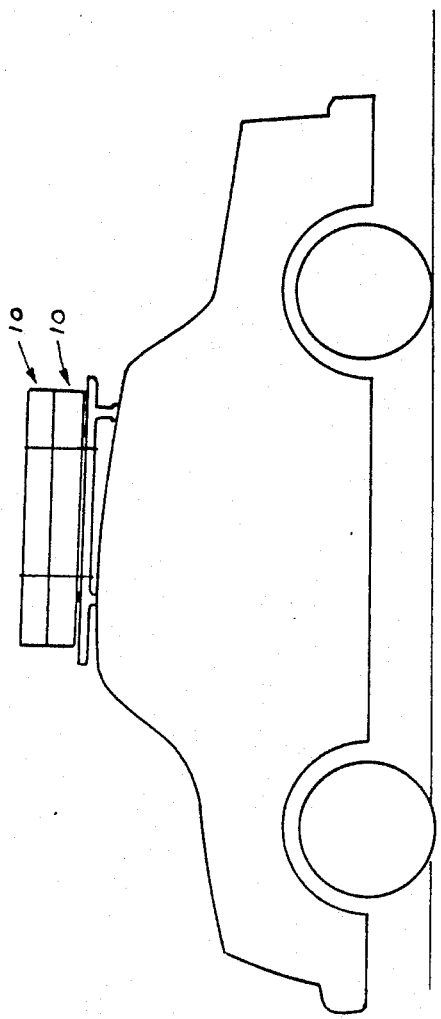
FIG. 11 is a side elevational view of an automobile having two campers according to the invention in the collapsed position secured to the top thereof.
Figure 12:
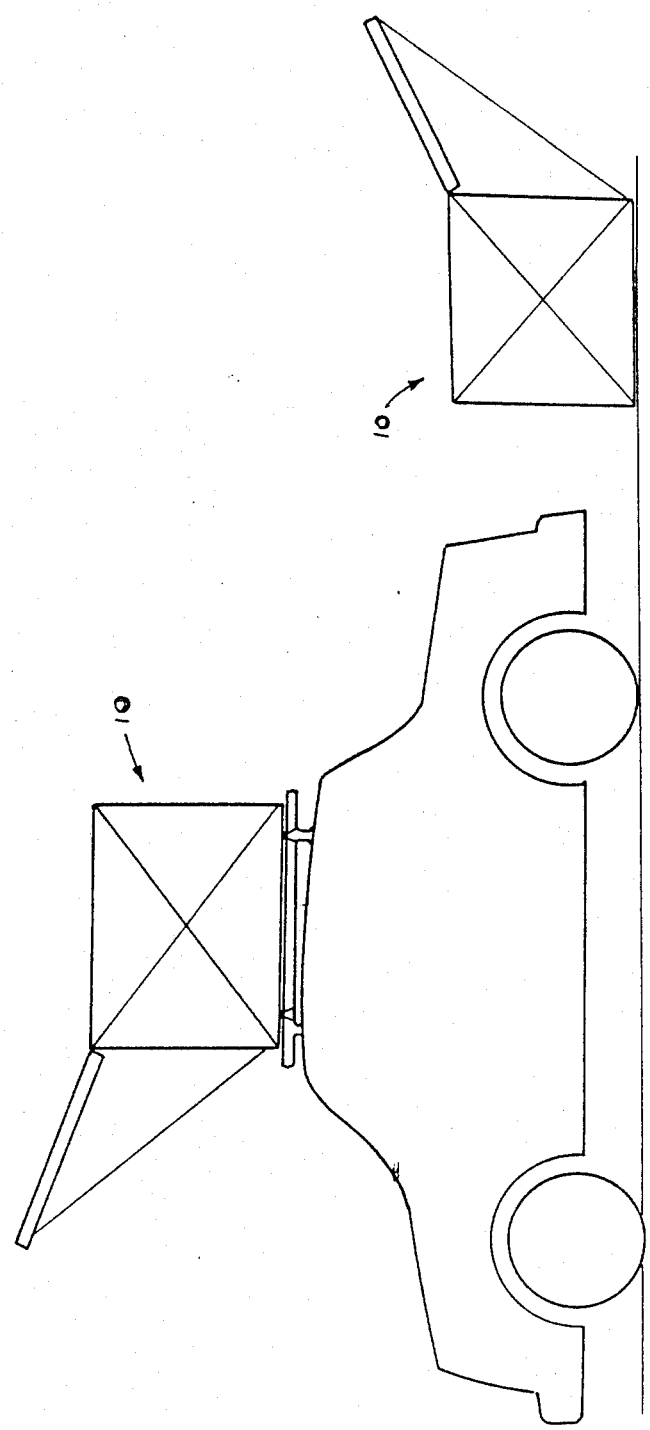
FIG. 12 is a view similar to FIG. 11 in which one of the campers is in an extended position on the ground and the other camper is in an extended position on the top of the automobile.

Referring to FIGS. 11 and 12, two campers 10 are illustrated as they might be used with an automobile. In FIG. 11, the two campers 10 are in their collapsed position and are shown secured atop an automobile. In FIG. 12, one of the campers 10 has been removed from the automobile and has been placed in the extended position on the ground. The other of the campers 10 is shown in the extended position atop the automobile. In each instance, the storage compartment 130 is not used with the camper 10, and the floor 12 is placed either on a rack secured to the top of the automobile or is placed on the ground, as the case may be.

As will be apparent from the foregoing description, the present invention provides an inexpensive, lightweight, compactly foldable camper which can be conveniently attached to, and removed from, an automobile. The camper is sufficiently compact and light in weight that the handling characteristics of the automobile are not affected adversely, and yet a habitable enclosure of substantial volume is available. Due to the light weight and compact nature of the camper, attachment to and removal from an automobile pose little difficulty. Storage can be accomplished easily, without the need for special stands or hangars.

Although the invention has been described in its preferred form with a certain degree of particularity, it is to be understood that the present disclosure of the preferred embodiment has been made only by way of example and various changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A camper adapted to be supported atop an automobile and capable of being collapsed from an extended configuration to a thin, compact configuration for travel or storage, comprising:

a generally planar floor;

means for connecting the floor to the automobile;

an enclosure connected to and supported atop the floor, the enclosure including:

rectangular first, second, and top wall portions which, together with the floor, define a quadrilateral when viewed from the side;

the side wall portions including a plurality of panels, three of the panels being hingedly connected to an adjacent panel and to an adjacent one of the first, second, and top wall portions;

a releasable, diagonal connection between adjacent side wall panels, the connection extending from one corner of the qualdrilateral to a diametrically opposite corner of the quadrilateral, the releasable connection, when released, permitting the panels to fold inwardly and the first, second, and top wall portions to be folded with respect to each other into a collapsed position;

first and second sections from which the enclosure is assembled, each section being of unitary construction, the first section including the first wall portion, the top wall portion, and front and upper side wall sections, and the second section including the second wall portion and rear and lower side wall sections; and a canopy pivotally connected to the enclosure at a location adjacent the intersection of the first wall portion and the top wall portion, the canopy being disposed on an outer side of the first wall, the canopy including depending flanges which enclose the remainder of the enclosure when the enclosure is in a collapsed position.

2. A camper adapted to be supported atop an automobile and capable of being collapsed from an extended configuration to a thin, compact configuration for travel or storage, comprising:

a generally planar floor;

means for connecting the floor to the automobile and its bumper, said means including tubing secured to the underside of the floor by means of brackets, a plurality of straps for connecting the tubing to the bumper, flexible straps and elastic cords connected between the floor and the automobile, and padded brackets disposed intermediate the floor and the automobile;

an enclosure connected to and supported atop the floor, the enclosure including a first wall supported for pivotal movement along a lower edge by a first pivotal support, a second wall connected to and supported atop the floor for pivotal movement along a lower edge by a second pivotal support, the second wall in the assembly configuration lying in a plane generally parallel to the plane in which the first wall lies, the first and second pivotal supports defining generally parallel lines spaced from each other, a top wall hingedly connected at opposed edges to upper edges of the first and second walls, the top wall in the extended configuration lying in a plane generally parallel to the floor, and multipaneled side walls being hingedly connected to the first, second and top walls, the individual panels of the side walls being movable with respect to each other and to the first, second and top walls, the movement of the panels permitting the first, second and top walls to be folded inwardly and stacked compactly;

a canopy pivotally connected to the enclosure at a location adjacent the intersection of the first wall and the top wall, the canopy being disposed on an outer side of the first wall, the canopy including depending flanges which enclose the remainder of the enclosure when the enclosure is in a collapsed position;

an opening in the first wall to provide access to the interior of the enclosure, the opening being closed by a flexible flap;

a cutout section in the floor in that region of the floor adjacent the first wall and a planar insert for filling in the cutout section when desired; and a collapsible storage compartment depending from the underside of the floor at a location adjacent the cutout section, the storage compartment in use being suspended beneath the floor.

3. The camper of claim 2, wherein each panel of each side wall is in the form of an approximately right-angled triangle, with the hypotenuse of three of the triangles being hingedly connected to a respective one of the first, second and top walls, and the approximate right-angled corners of the triangle being adjacent each other when the enclosure is in the extended configuration, a line extending from the second pivotal support to diametrically opposite upper edge of the first wall defining a hinge connection between respective triangles of two pairs of triangles, and said respective pairs of triangles being releasably connected to each other along a line extending from the first pivotal support to the diametrically opposite upper edge of the second wall.

4. The camper of claim 2, wherein the first wall, second wall, top wall and side walls are formed of cardboard.

5. The camper of claim 4, wherein the enclosure is assembled from first and second sections, each section being formed from a single piece of cardboard.

6. The camper of claim 5, wherein the first section includes the first wall, top wall, and front and upper side wall sections, and the second section includes the second wall and rear and lower side wall sections.

7. The camper of claim 2, wherein the canopy is formed of cardboard.

8. The camper of claim 1, wherein each panel of each side wall is in the form of an approximate right-angled triangle, with the hypotenuse of three of the triangles being hingedly connected to a respective one of the first, second and top walls, and the approximate right-angled corners of the triangles being adjacent each other when the enclosure is in the extended configuration, a line extending from the second pivotal support to a diametrically opposite upper edge of the first wall defining a hinged connection between respective triangles of two pairs of triangles, and said respective pairs of triangles being releasably connected to each other along a line extending from the first pivotal support to the diametrically opposite upper edge of the second wall.

9. The camper of claim 1, wherein the first wall, second wall, top wall and side wall portions are formed of cardboard.

10. The camper of claim 1, wherein the canopy is formed of cardboard.

* * * * *